US012659292B2

(12) United States Patent
Pezeshki et al.

(10) Patent No.: US 12,659,292 B2
(45) Date of Patent: *Jun. 16, 2026

(54) RESOLVING AND MANAGING BLOCKCHAIN DOMAINS

(71) Applicant: Unstoppable Domains Inc., Las Vegas, NV (US)

(72) Inventors: Braden River Pezeshki, Reno, NV (US); Matthew Everett Gould, Reno, NV (US); Bogdan Gusiev, Kyiv (UA)

(73) Assignee: Unstoppable Domains Inc., Las Vegas, NV (US)

( * ) Notice: Subject to any disclaimer, the term of this patent is extended or adjusted under 35 U.S.C. 154(b) by 24 days.

This patent is subject to a terminal disclaimer.

(21) Appl. No.: 18/631,793

(22) Filed: Apr. 10, 2024

(65) Prior Publication Data

US 2024/0275609 A1     Aug. 15, 2024

Related U.S. Application Data

(63) Continuation of application No. 17/321,102, filed on May 14, 2021, now Pat. No. 11,985,252.
(Continued)

(51) Int. Cl.
*H04L 9/32* (2006.01)
*H04L 12/66* (2006.01)
(Continued)

(52) U.S. Cl.
CPC ........ *H04L 61/4511* (2022.05); *H04L 9/3236* (2013.01); *H04L 9/3247* (2013.01);
(Continued)

(58) Field of Classification Search
None
See application file for complete search history.

(56) References Cited

U.S. PATENT DOCUMENTS 10,361,843 B1    7/2019   Suthar
10,540,654 B1    1/2020   James
(Continued)

FOREIGN PATENT DOCUMENTS

EP          3782346        2/2021
WO       2019027409        2/2019
(Continued)

OTHER PUBLICATIONS

Patent Owner's Preliminary Response to Inter-Partes Review in U.S. Pat. No. 11,558,344 filed on Aug. 29, 2024.
(Continued)

*Primary Examiner* — Jeffrey C Pwu
*Assistant Examiner* — Mayasa A. Shaawat
(74) *Attorney, Agent, or Firm* — Van Pelt, Yi & James LLP

(57)          ABSTRACT

A request is received to resolve a name identifier into a target record of a specified record type requested in the request, wherein the name identifier serves as an alternative identifier that is used in place of a target identifier in the target record. Using a blockchain, the target record of the specified record type that resolves from the name identifier is obtained, including by selecting the specified record type among a plurality of different record types available to be resolved from the same name identifier. The same name identifier is able to be used as the alternative identifier in place of each of different target identifiers of the plurality of different record types. In response to the request, the target identifier in the target record of the specified record type that corresponds to the name identifier is provided.

18 Claims, 10 Drawing Sheets

100

Related U.S. Application Data

(60) Provisional application No. 63/084,493, filed on Sep. 28, 2020.

(51) Int. Cl.

| | |
|---|---|
| *H04L 61/4511* | (2022.01) |
| *H04L 61/5007* | (2022.01) |
| *H04L 67/02* | (2022.01) |
| *G06Q 20/38* | (2012.01) |
| *H04L 9/00* | (2022.01) |

(52) U.S. Cl.
 CPC .......... *H04L 12/66* (2013.01); *H04L 61/5007* (2022.05); *H04L 67/02* (2013.01); *G06Q 20/389* (2013.01); *H04L 9/50* (2022.05)

(56) References Cited

U.S. PATENT DOCUMENTS

| | | | |
|---|---|---|---|
| 10,721,060 B1 * | 7/2020 | Kaizer | .................. H04L 63/123 |
| 10,990,584 B1 * | 4/2021 | Basak | ..................... G06F 16/28 |
| 11,720,552 B2 | 8/2023 | Kasimov | |
| 11,727,366 B1 | 8/2023 | Cutler | |
| 2004/0249939 A1 | 12/2004 | Amini | |
| 2005/0235031 A1 | 10/2005 | Schneider | |
| 2013/0114432 A1 | 5/2013 | Haynes | |
| 2017/0048234 A1 | 2/2017 | Lohe | |
| 2017/0048235 A1 | 2/2017 | Lohe | |
| 2017/0085555 A1 | 3/2017 | Bisikalo | |
| 2017/0109735 A1 | 4/2017 | Sheng | |
| 2017/0221052 A1 | 8/2017 | Sheng | |
| 2017/0236123 A1 | 8/2017 | Ali | |
| 2018/0115413 A1 | 4/2018 | King | |
| 2019/0043048 A1 | 2/2019 | Wright | |
| 2019/0108140 A1 | 4/2019 | Deshpande | |
| 2019/0166085 A1 | 5/2019 | Li | |
| 2019/0318359 A1 | 10/2019 | Arora | |
| 2019/0340269 A1 | 11/2019 | Biernat | |
| 2019/0349426 A1 * | 11/2019 | Smith | ................. H04L 41/0806 |
| 2019/0358515 A1 | 11/2019 | Tran | |
| 2020/0028691 A1 | 1/2020 | Rao | |
| 2020/0044827 A1 | 2/2020 | Snow | |
| 2020/0117690 A1 | 4/2020 | Tran | |
| 2020/0118131 A1 | 4/2020 | Diriye | |
| 2020/0133955 A1 | 4/2020 | Padmanabhan | |
| 2020/0134656 A1 | 4/2020 | Padmanabhan | |
| 2020/0143469 A1 | 5/2020 | Stewart | |
| 2020/0167773 A1 | 5/2020 | Cervenka | |
| 2020/0201560 A1 | 6/2020 | Yang | |
| 2020/0202021 A1 | 6/2020 | Chee | |
| 2020/0213090 A1 | 7/2020 | Gupta | |
| 2020/0242105 A1 | 7/2020 | Rich | |
| 2020/0322154 A1 | 10/2020 | Konda | |
| 2020/0328883 A1 | 10/2020 | Kaizer | |
| 2020/0358784 A1 | 11/2020 | Khaund | |
| 2021/0158335 A1 | 5/2021 | Bollen | |
| 2021/0211468 A1 | 7/2021 | Griffin | |
| 2021/0240784 A1 * | 8/2021 | Xiao | .................. G06F 16/9566 |
| 2021/0319433 A1 | 10/2021 | Yantis | |
| 2021/0328778 A1 | 10/2021 | Becher | |
| 2022/0198447 A1 * | 6/2022 | Haruna | .................. G06Q 20/02 |
| 2022/0318796 A1 | 10/2022 | Zhou | |
| 2023/0206216 A1 | 6/2023 | Lehmann | |

FOREIGN PATENT DOCUMENTS

| | | | |
|---|---|---|---|
| WO | WO-2019027409 A1 * | 2/2019 | ............. G06F 12/02 |
| WO | 2020051160 | 3/2020 | |

OTHER PUBLICATIONS

Petition for Inter Partes Review of U.S. Pat. No. 11,558,344 filed on May 2, 2024, pp. 1-76.

Exhibit 1003 from Petition for Inter Partes Review of U.S. Pat. No. 11,558,344, filed on May 2, 2024. Nick Johnson, ENS Documentation, Release 0.1, Mar. 30, 2019. (captured on the Internet Archive, Dec. 13, 2019) https://buildmedia.readthedocs.org/media/pdf/ens/latest/ens.pdf.

Exhibit 1004 from Petition for Inter Partes Review of U.S. Pat. No. 11,558,344 , filed on May 2, 2024. Brantly Millegan, "ENS Now Supports Tor .Onion Address Resolution," Aug. 13, 2019 (captured on the Internet Archive, Aug. 15, 2019). https://medium.com/the-ethereum-name-service/ens-now-supports-tor-onion-address-resolution-9bb3bdff6217.

Exhibit 1006 from Petition for Inter Partes Review of U.S. Pat. No. 11,558,344, filed on May 2, 2024. Jim McDonald, "EthDNS: an Ethereum backend for the Domain Name System," Jan. 22, 2018 (captured on the Internet Archive, Feb. 8, 2018) https://medium.com/@jgm.orinoco/ethdns-an-ethereum-backend-for-the-domain-name-system-d52dabd904b3.

Exhibit 1008 from Petition for Inter Partes Review of U.S. Pat. No. 11,558,344, filed on May 2, 2024. Richard Moore, "EIP-634: Storage of text records in ENS," May 17, 2017 (captured on the Internet Archive Mar. 13, 2019) https://eips.ethereum.org/EIPS/eip-634.

Exhibit 1012 from Petition for Inter Partes Review of U.S. Pat. No. 11,558,344, filed on May 2, 2024. Vaibhav Saini, "StoragePedia: An Encyclopedia of 5 Blockchain Storage Platforms," Aug. 13, 2018 (captured on the Internet Archive Aug. 21, 2018). Available: https://hackernoon.com/storagepedia-an-encyclopedia-of-5-blockchain-storage-platform-8aa13c630ace.

Exhibit 1016 from Petition for Inter Partes Review of U.S. Pat. No. 11,558,344, filed on May 2, 2024. Entriken, William et al., "ERC-721: Non-Fungible Token Standard," Ethereum Improvement Proposals, No. 721, Jan. 2018. [Online serial]. Available: https://eips.ethereum.org/EIPS/eip-721.

Exhibit 1019 from Petition for Inter Partes Review of U.S. Pat. No. 11,558,344, filed on May 2, 2024. Ethereum Name Service, ".eth Permanent Registrar," captured on the Internet Archive, May 4, 2019, https://web.archive.org/web/20190504155147/https://docs.ens.domains/contract-api-reference/.eth-permanent-registrar.

Exhibit 1030 from Petition for Inter Partes Review of U.S. Pat. No. 11,558,344, filed on May 2, 2024. Lutkevich, Ben, et al., Definition: domain name system (DNS), Aug. 2021. Available: https://www.techtarget.com/searchnetworking/definition/domain-name-system.

Exhibit 1031 from Petition for Inter Partes Review of U.S. Pat. No. 11,558,344, filed on May 2, 2024. "What is DNS? How DNS works." Available: https://www.cloudflare.com/learning/dns/what-is-dns/.

Exhibit 1032 from Petition for Inter Partes Review of U.S. Pat. No. 11,558,344, filed on May 2, 2024. Yasar, Kinza, Definition: IP address (Internet Protocol address), Jan. 2023. Available: https://www.techtarget.com/whatis/definition/IP-address-Internet-Protocol-Address.

Exhibit 1033 from Petition for Inter Partes Review of U.S. Pat. No. 11,558,344, filed on May 2, 2024. IP Tracker. Available: https://www.ip-tracker.org/lookup.php?ip=nytimes.com.

Exhibit 1034 from Petition for Inter Partes Review of U.S. Pat. No. 11,558,344, filed on May 2, 2024. Scarpati, Jessica, et al., Definition: URL (Uniform Resource Locator), Sep. 2021. Available: https://www.techtarget.com/searchnetworking/definition/URL.

Exhibit 1035 from Petition for Inter Partes Review of U.S. Pat. No. 11,558,344, filed on May 2, 2024. Coen, Emanuel, "What is the Ethereum Name Service and what is it good for?" (Almost 4 Years Ago). Available: https://cryptotesters.com/blog/what-is-the-ethereum-name-service-ens-and-what-is-it-good-for.

Exhibit 1036 from Petition for Inter Partes Review of U.S. Pat. No. 11,558,344, filed on May 2, 2024. CloudFlare, "DNS server types." Available: https://www.cloudflare.com/learning/dns/dns-server-types/.

Exhibit 1037 from Petition for Inter Partes Review of U.S. Pat. No. 11,558,344, filed on May 2, 2024. Barney, Nick, et al., "Definition: blockchain," Oct. 2023. Available: https://www.techtarget.com/searchcio/definition/blockchain.

Exhibit 1038 from Petition for Inter Partes Review of U.S. Pat. No. 11,558,344, filed on May 2, 2024. Ravikiran A S, What is Blockchain Technology? How Does Blockchain Work? {Updated}, Oct. 18,

(56) References Cited

OTHER PUBLICATIONS

2023. Available: https://www.simplilearn.com/tutorials/blockchain-tutorial/blockchain-technology#:~:text=A%20blockchain%20is%20a%20distributed%2C%20immutable%2C%20and%20decentralized%20ledger%20at,a%20chronological%20chain%20of%20information.

Exhibit 1039 from Petition for Inter Partes Review of U.S. Pat. No. 11,558,344, filed on May 2, 2024. MetaMask, "Learn the basics of blockchains and Ethereum (miners and validators, gas, cryptocurrencies and NFTs, block explorer, networks, etc.)." Available: https://support.metamask.io/hc/en-us/articles/360015489611-Learn-the-basics-of-blockchains-and-Ethereum-miners-and-validators-gas-cryptocurrencies-and-NFTs-block-explorer-networks-etc.

Exhibit 1040 from Petition for Inter Partes Review of U.S. Pat. No. 11,558,344, filed on May 2, 2024. Kerner, Sean Michael, et al., "Definition: Ethereum," Jan. 2022. Available: https://www.techtarget.com/whatis/definition/ Ethereum#:~:text=Ethereum%20is%20a%20blockchain%2Dbased,a%20number%20of%20financial%20uses.

Exhibit 1041 from Petition for Inter Partes Review of U.S. Pat. No. 11,558,344, filed on May 2, 2024. Barney, Nick, et al., "Definition: smart contract," Sep. 2023. Available: https://www.techtarget.com/searchcio/definition/smart-contract#:~:text=Smart%20contracts%20function%20on%20the,in%20the%20contract%20are%20executed.

Exhibit 1042 from Petition for Inter Partes Review of U.S. Pat. No. 11,558,344, filed on May 2, 2024. Barney, Nick, et al. Definition: non-fungible token (NFT), Sep. 2023. Available: https://www.techtarget.com/whatis/definition/nonfungible-token-NFT#:~:text=NFTs%20are%20created%20using%20smart,such%20as%20ownership%20and%20transferability.

Exhibit 1043 from Petition for Inter Partes Review of U.S. Pat. No. 11,558,344, filed on May 2, 2024. Amazon, Non-Fungible Tokens (NFTs) Explained. Available: https://aws.amazon.com/blockchain/nfts-explained/#:~:text=Under%20the%20hood%2C%20a%20non,token%20to%20a%20new%20owner.

Exhibit 1044 from Petition for Inter Partes Review of U.S. Pat. No. 11,558,344, filed on May 2, 2024. Sharma, Rakesh, et al., "Cryptocurrency: Non-Fungible Token (NFT): What It Means and How It Works," Jan. 28, 2024. Available: https://www.investopedia.com/non-fungible-tokens-nft-5115211#:~:text=Non%2Dfungible%20tokens%20(NFTs),are%20stored%20in%20other%20places.

Exhibit 1045 from Petition for Inter Partes Review of U.S. Pat. No. 11,558,344, filed on May 2, 2024. Wade, Jacob, et al., "Cryptocurrency—Strategy & Education: How to Create an NFT," Dec. 9, 2023. Available: https://www.investopedia.com/how-to-create-an-nft-6362495.

Exhibit 1046 from Petition for Inter Partes Review of U.S. Pat. No. 11,558,344, filed on May 2, 2024. DeFi—Non-Fungible Tokens (NFTs): The Technical Structure of NFTs Explained, Mar. 10, 2023. Available: https://www.gemini.com/cryptopedia/what-is-a-non-fungible-token-nft-crypto.

Exhibit 1047 from Petition for Inter Partes Review of U.S. Pat. No. 11,558,344, filed on May 2, 2024. Cooling, Sam, "What is ERC-721?" Jul. 20, 2023. Available: https://www.techopedia.com/definition/erc-721.

Exhibit 1048 from Petition for Inter Partes Review of U.S. Pat. No. 11,558,344, filed on May 2, 2024. Ethereum, "ERC-721 Non-Fungible Token Standard," Nov. 19, 2023. Available: https://ethereum.org/en/developers/docs/standards/tokens/erc-721/.

Exhibit 1050 from Petition for Inter Partes Review of U.S. Pat. No. 11,558,344, filed on May 2, 2024. Future Learn. "How do crypto-wallets work?" RMIT 2021. Available: https://www.futurelearn.com/info/courses/defi-exploring-decentralised-finance-with-blockchain-technologies/0/steps/254823#:~:text=In%20the%20context%20of%20blockchains,wallet%20does%20not%20hold%20tokens.

Exhibit 1051 from Petition for Inter Partes Review of U.S. Pat. No. 11,558,344, filed on May 2, 2024. "Ethereum wallets: A beginner's guide to storing ETH." Available: https://cointelegraph.com/learn/ethereum-wallets-a-beginners-guide-to-storing-eth.

Exhibit 1052 from Petition for Inter Partes Review of U.S. Pat. No. 11,558,344, filed on May 2, 2024. Ghobadi, Arya, "What is MetaMask?" Mar. 15, 2022. Available: https://thedefiant.io/what-is-metamask.

Exhibit 1053 from Petition for Inter Partes Review of U.S. Pat. No. 11,558,344, filed on May 2, 2024. Shi, Z. et al., "Integration of Blockchain and Auction Models: A Survey, Some Applications, and Challenges," IEEE Communications Surveys & Tutorials, vol. 25, No. 1, First Quarter 2023, pp. 497-537, https://doi.org/10.1109/COMST.2022.3222403. Available: https://ieeexplore.ieee.org/stamp/stamp.jsp?arnumber=9953944.

Exhibit 1054 from Petition for Inter Partes Review of U.S. Pat. No. 11,558,344, filed on May 2, 2024. Seike, H., et al., "Blockchain-Based Ubiquitous Code Ownership Management System without Hierarchical Structure," 2018 IEEE SmartWorld, Cloud & Big Data Computing, Internet of People and Smart City Innovation (SmartWorld/SCALCOM/UIC/ATC/CBDCom/IOP/SCI), Guangzhou, China, 2018, pp. 271-276, doi: 10.1109/SmartWorld.2018.00081. Available: https://ieeexplore.ieee.org/document/8560059.

Exhibit 1055 from Petition for Inter Partes Review of U.S. Pat. No. 11,558,344, filed on May 2, 2024. CryptoNinjas, "Ethereum Name Service (ENS) now supports Tor .onion addresses," Aug. 14, 2019. Available: https://www.cryptoninjas.net/2019/08/14/ethereum-name-service-ens-now-supports-tor-onion-addresses/.

Exhibit 1056 from Petition for Inter Partes Review of U.S. Pat. No. 11,558,344, filed on May 2, 2024. Cryptonomist, Tor: the onion domain on Ethereum Name Service, Aug. 15, 2019. Available: https://en.cryptonomist.ch/2019/08/15/tor-on-ethereum-name-service/.

Eugene Shumilov, "3 ways to use Blockchain DNS in your browser", pp. 1-3, Sep. 21, 2017, Medium, https://medium.com/@emer.tech/3-ways-to-use-blockchain-dns-in-your-browser-79d937028407 (last visited Jul. 7, 2023).

Firefox uU.S. Appl. No. 13/228,151, "Blockchain DNS," pp. 1-3, Apr. 23, 2018, Firefox Browser ADD-ONS, https://addons.mozilla.org/en-US/firefox/addon/b-dns/ (last visited Jul. 7, 2023).

Nick Johnson, "EIP-137: Ethereum Domain Name Service—Specification," Ethereum Improvement Proposals, No. 137, Apr. 2016. [Online serial]. Available: https://eips.ethereum.org/EIPS/eip-137.

Phyrex Tsai, Portal Network Team, "EIP-1062: Formalize IPFS hash into ENS(Ethereum NameService) resolver [DRAFT]," Ethereum Improvement Proposals, No. 1062, May 2018. [Online serial]. Available: https://eips.ethereum.org/EIPS/eip-1062.

Steve Despres, "DNS on Blockchain: the next evolution of domain names?", pp. 1-8, Apr. 8, 2020, Nameshield Blog, https://blog.nameshield.com/blog/2020/04/08/dns-on-blockchain-the-next-evolution-of-domain-names/ (last visited Jul. 7, 2023).

Decision Denying Institution of Inter Partes Review of U.S. Pat. No. 11,558,344 mailed Nov. 22, 2024, pp. 1-27.

* cited by examiner

302   Receive a request specifying a management action to be performed

304   Determine whether the request specifying the management action is authorized 306   Allow the management action to be performed if the request is determined to be authorized

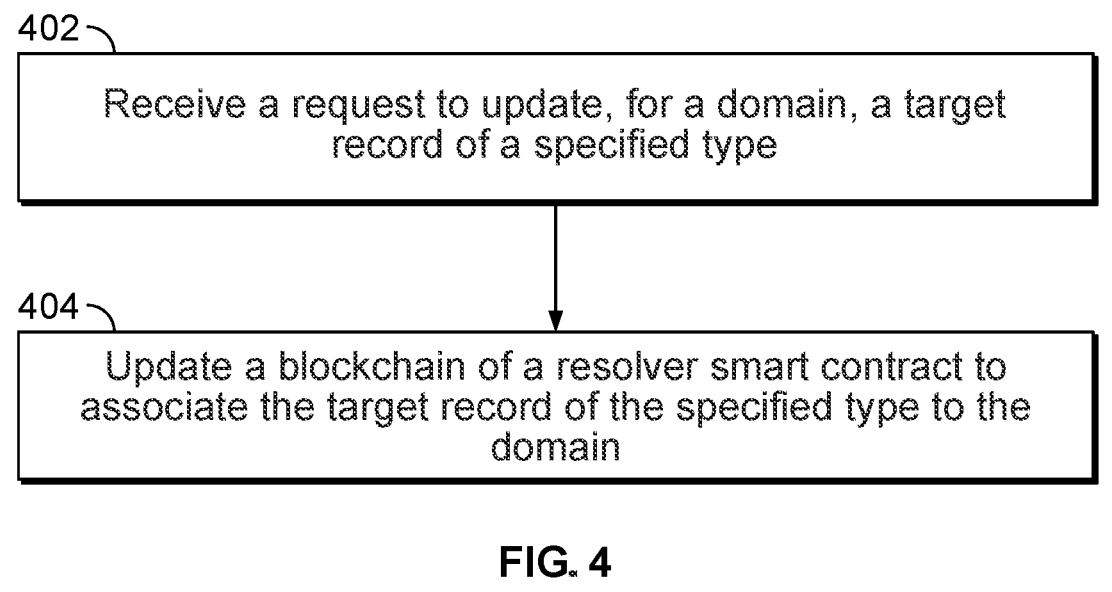

402

Receive a request to update, for a domain, a target
record of a specified type

404

Update a blockchain of a resolver smart contract to
associate the target record of the specified type to the
domain

FIG. 4

Example Meta-Transaction Flow

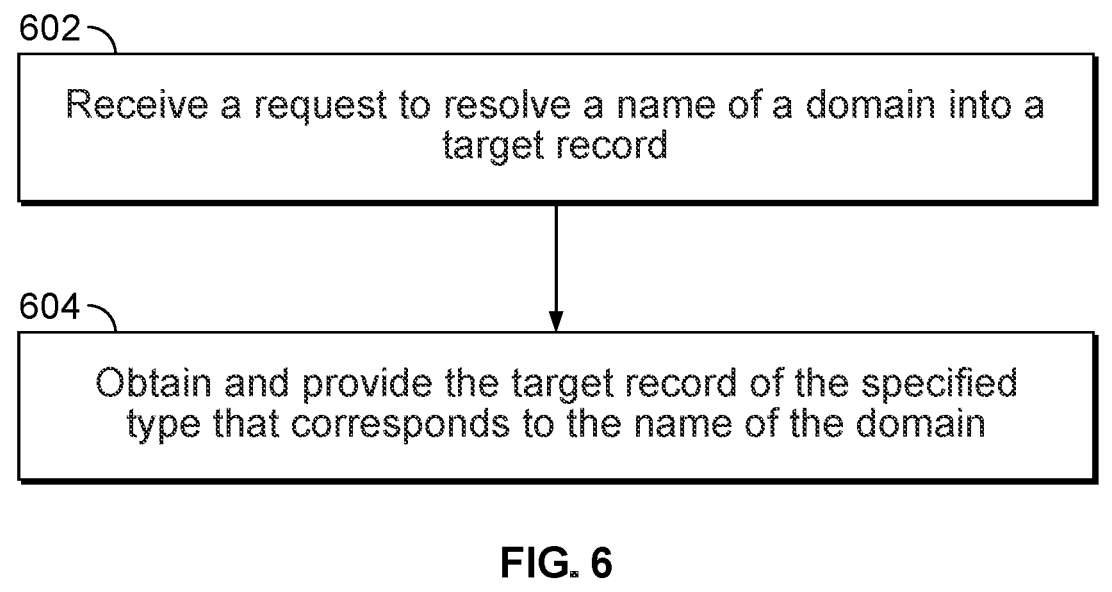

602 ⌐

Receive a request to resolve a name of a domain into a
target record

604 ⌐

Obtain and provide the target record of the specified
type that corresponds to the name of the domain

FIG. 6

Figure 7:
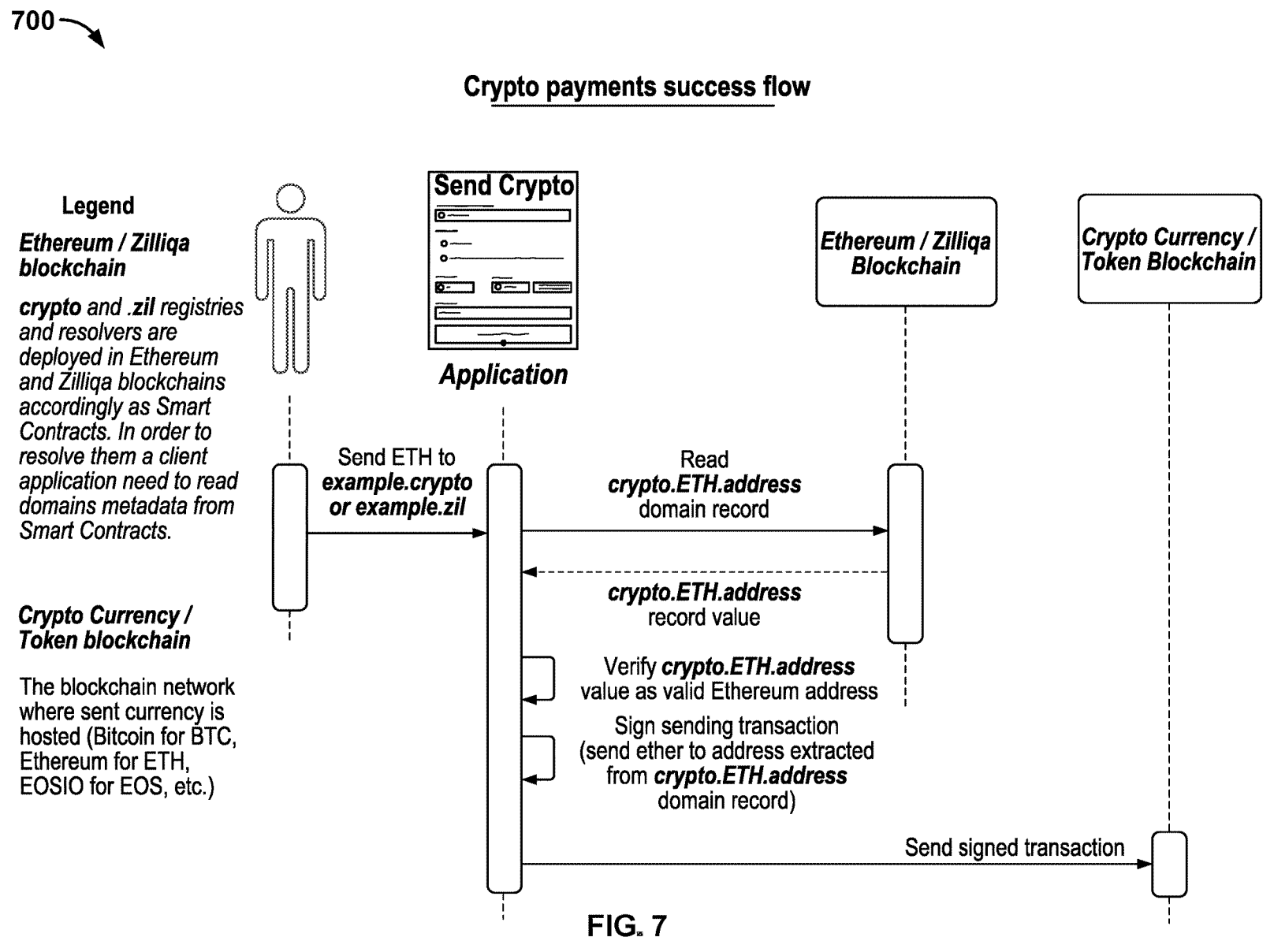

Crypto payments success flow

Legend

Ethereum / Zilliqa blockchain

*crypto* and *.zil* registries and resolvers are deployed in Ethereum and Zilliqa blockchains accordingly as Smart Contracts. In order to resolve them a client application need to read domains metadata from Smart Contracts.

Crypto Currency / Token blockchain

The blockchain network where sent currency is hosted (Bitcoin for BTC, Ethereum for ETH, EOSIO for EOS, etc.)

Crypto Currency / Token Blockchain

Ethereum / Zilliqa Blockchain

Send Crypto

*Application*

Send ETH to *example.crypto or example.zil*

Read *crypto.ETH.address* domain record

*crypto.ETH.address* record value

Verify *crypto.ETH.address* value as valid Ethereum address

Sign sending transaction (send ether to address extracted from *crypto.ETH.address* domain record)

Send signed transaction

RESOLVING AND MANAGING BLOCKCHAIN DOMAINS

CROSS REFERENCE TO OTHER APPLICATIONS

This application claims priority to U.S. patent application Ser. No. 17/321,102 entitled RESOLVING AND MANAGING BLOCKCHAIN DOMAINS filed May 14, 2021 which is incorporated herein by reference for all purposes, which is a continuation of U.S. Provisional Patent Application No. 63/084,493 entitled BLOCKCHAIN DOMAINS filed Sep. 28, 2020 which is incorporated herein by reference for all purposes.

BACKGROUND OF THE INVENTION

Domain name system is a naming system for computer resources connected to a network. It allows a user to refer to the resource using a human-friendly identifier that is easy to understand and remember rather than requiring the user to use a native functional identifier that is often unintuitive and difficult to remember. For example, the domain name system allows a user to reference a website by its human-friendly hostname/URL (Uniform Resource Locator) rather than using its IP (Internet Protocol) address. Typically a domain name registrar acts as a centralized entity that manages registration, record updating, transfer, and hosting of a domain name system. However, this centralized management and execution of the domain name system concentrates power and innovation in a central entity that may not be able to fulfill its duty in the best interest of the community. For example, the central entity may become a central point of failure, stifle innovation, or unjustly institute policies that prevent flow of information.

BRIEF DESCRIPTION OF THE DRAWINGS

Various embodiments of the invention are disclosed in the following detailed description and the accompanying drawings.

FIG. 4 is a flowchart illustrating an embodiment of a process for updating target records of a domain managed using a blockchain-based name service.

FIG. 6 is a flowchart illustrating an embodiment of a process for resolving a domain managed using a blockchain-based name service.

FIG. 7 is a flow diagram illustrating an embodiment of resolving a name identifier using a blockchain-based name service for a cryptocurrency transaction.

DETAILED DESCRIPTION

Figure 1:
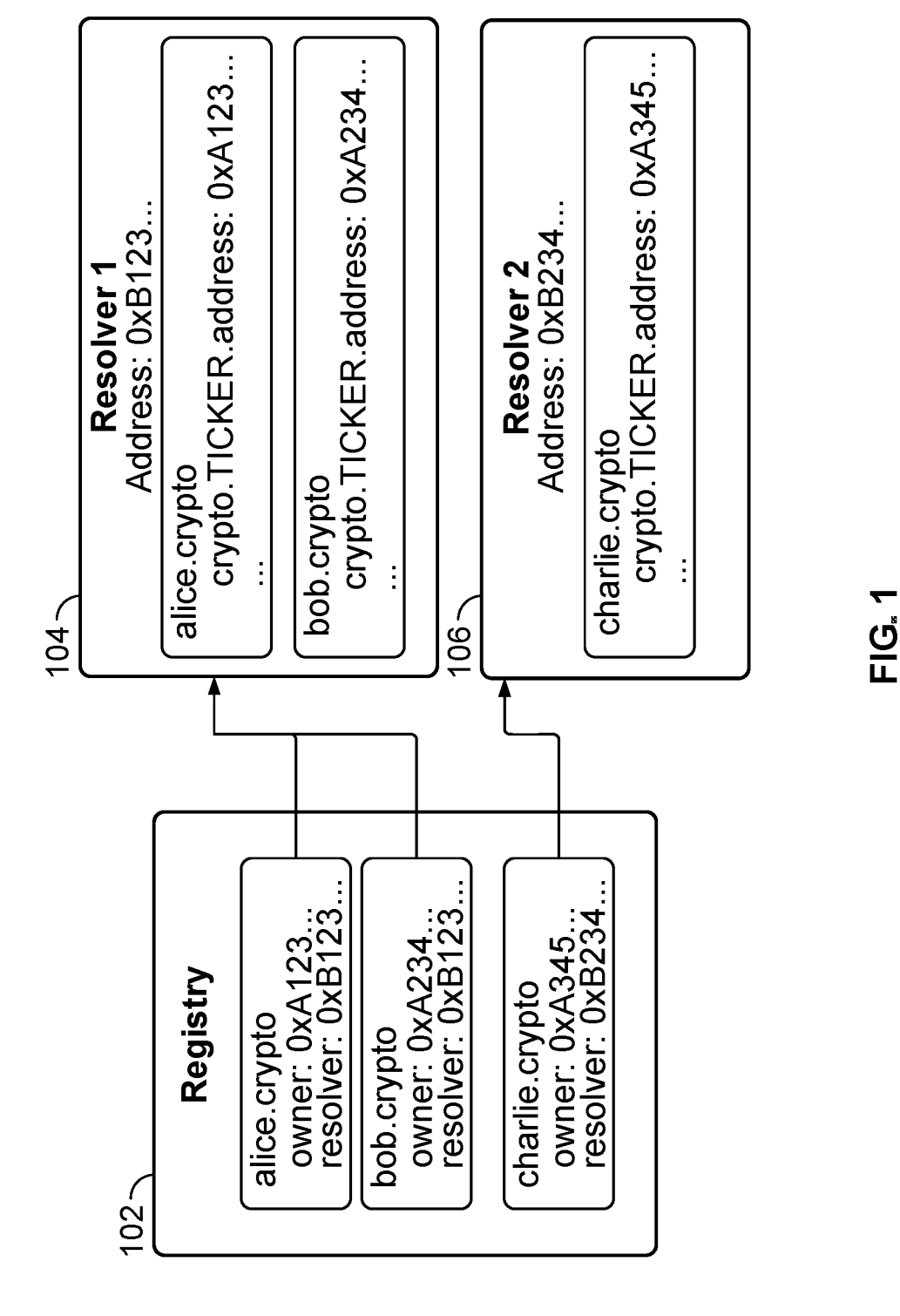
FIG. 1 is a block diagram illustrating an embodiment of blockchain smart contracts utilized to implement a name service on a blockchain.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A decentralized name service based on blockchain technology is disclosed. In some embodiments, the name service is based on a set of smart contracts on the crypto blockchain (e.g., Ethereum blockchain) that govern how domains are created and used. Although it can serve a similar purpose as a traditional DNS system, a decentralized name service has architectural differences that change the interaction model. For example, decentralized name service domains can be owned irrevocably. In some embodiments, they do not need to be renewed and cannot be reclaimed by a central authority. For example, once claimed, users have complete control of their domains. The blockchain is a decentralized and distributed computer ledger that records transactions that are publically viewable and verifiable. The transactions can be audited to ensure an object tracked on the blockchain has been transferred only once between each party in each transaction without being reproduced to be double spent. By tracking ownership of a domain on the name service blockchain, public, secure, and verifiable ownership of a domain is ensured.

The decentralized name service is deployed using smart contracts. A smart contract includes self-executing code that functions to implement an agreement deployed to store state and execute code on the blockchain. This allows an agreed upon contract code to execute in a distributed and verifiable manner. The smart contracts of the decentralized name service govern how domains are created, managed, and utilized. For example, every domain is issued a non-fungible token on the blockchain that is owned by an owner (e.g., irrevocably—cannot be reclaimed by a central authority and does not need to be renewed). The owner can transfer ownership of the token to transfer ownership of the domain to another user via a compatible wallet, exchange, or marketplace rather than only from a single central authority.

In some embodiments, an association between the name identifier of a domain and a corresponding owner account is stored in a blockchain using a registry smart contract. An association between the name identifier of the domain and a corresponding resolver smart contract is stored in the blockchain using the registry smart contract. An association between the name identifier of the domain and the target record of a specified type is stored in the blockchain using the corresponding resolver smart contract. When resolving a name identifier of a domain into a target record, a request can be issued to the resolver smart contract that returns the requested target record. For example, a name identifier "bob.crypto" can be resolved into an IP address type target record or a cryptocurrency wallet address type target record using the blockchain smart contracts of the name service.

Some owners of domains may not want to directly manage the domains but rather have someone else manage it. In some embodiments, the decentralized name service allows a management action associated with a domain to be performed by an authorized non-owner account. The authorization of the non-owner account to have control over the domain token is stored in a blockchain of a registry smart contract in some embodiments, while in another embodiment the management action request is cryptographically signed by the owner account and provided by the non-owner account to prove authorization.

FIG. 1 is a block diagram illustrating an embodiment of blockchain smart contracts utilized to implement a name service on a blockchain. In some embodiments, the shown blockchain smart contracts are executed by one or more networked computers implementing a distributed blockchain (e.g., one or more computers of blockchain 908 of FIG. 9). Two different types of smart contracts utilized for the name service include a registry smart contract and a resolver smart contract. These smart contracts may be deployed on the Ethereum open-source blockchain but may be deployed in other blockchains in various different embodiments. The registry smart contract can function to map each registered domain to an owner account address and a specific corresponding resolver smart contract that can be used to resolve a name identifier of the domain to a target record (e.g., IP address, cryptocurrency address, etc.). By separating the registry functionality and resolution functionality into different smart contracts, different types of resolver contracts can be linked to a domain, allowing an owner to either use a standard resolver smart contract or a custom resolver smart contract. Multiple different domains of the registry smart contract can point to the same resolver smart contract.

In the example diagram 100 shown in FIG. 1, registry smart contract 102 stores entries associated with three domains. Each of these domains is associated with a non-fungible token stored on a blockchain and associate together a name identifier of each domain to an owner account address and an address of a resolver smart contract that is to be used to resolve the name identifier of the domain. First, two domains of registry smart contract 102 reference the same standard resolver contract 104 that can resolve name identifiers of a plurality of different domains. The third shown domain of registry smart contract 102 references a different custom resolver contract 106 that may function differently from resolver contract 104 in resolving its associated domain(s). Each resolver smart contract includes records for one or more different domains and specifies how and what the name identifier of each domain is to be resolved to corresponding target identifier(s). A single name identifier of one domain may map to a plurality of different target identifiers that are of different types. For example, "alice.crypto" name identifier may resolve to an IP address when requested via a web browser and may resolve to a cryptocurrency address when used as a payment target.

Figure 2:
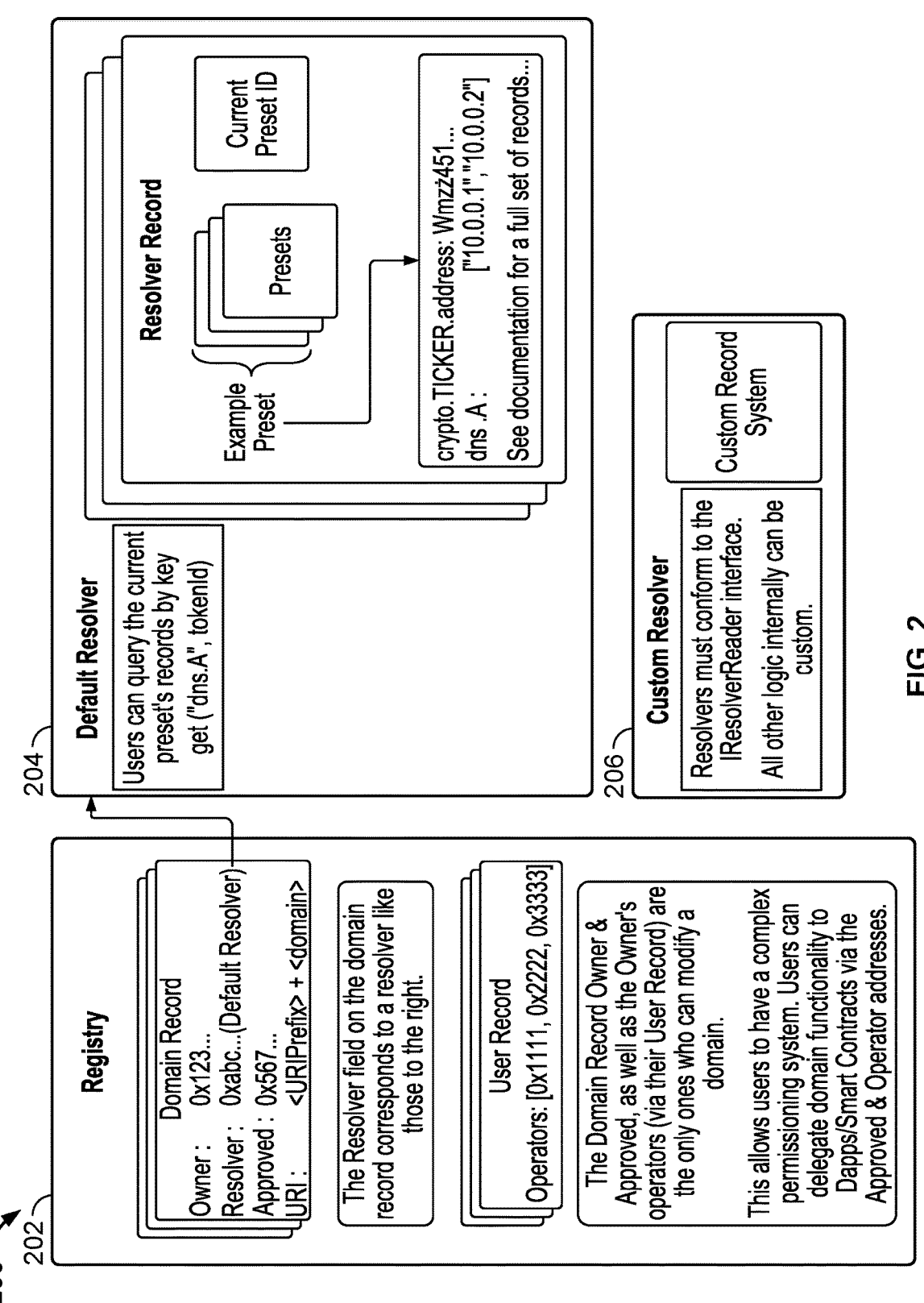
FIG. 2 is a block diagram illustrating additional details of an embodiment of an implementation of blockchain smart contracts of a decentralized name service.

FIG. 2 is a block diagram illustrating additional details of an embodiment of an implementation of blockchain smart contracts of a decentralized name service. In some embodiments, the shown blockchain smart contracts are executed by one or more networked computers implementing a distributed blockchain (e.g., one or more computers of blockchain 908 of FIG. 9). As shown in diagram 200, registry smart contract 202 defines and manages ownership of domains on the blockchain. For example, it defines ownership rules, how new domains are created and transferred, manages the non-fungible token (e.g., ERC-721 token) representing each domain, and stores metadata of domains on the blockchain. Each domain created and managed via registry smart contract 202 is associated with its unique non-fungible token and domain record. In some embodiments, the domain record for a domain stores an account address of the owner of the domain (e.g., user account address), an identifier (e.g., address) of a resolver smart contract assigned to resolve the domain, an optional address of another approved user allowed to manage the specific domain on behalf of the owner, and an identifier of the domain (e.g., hashed version of the name of the domain allowing users to reference the domain record by hashing the name of the domain to obtain the hash that can be used as an identifier of the name of the domain). Users can invoke a program function of registry smart contract 202 to read, modify, and/or manage a domain record of registry smart contract 202.

In the event an owner desires to allow another account to manage every domain owned by the user (e.g., instead of just individual domains), the owner is able to add the account address of another user as an operator in a user record of the owner stored by registry smart contract 202. The added user now becomes that operator for the owner and is able to access and manage every domain of the owner. More than one authorized operator user can be added to the user record of a particular owner. The owner, the approved user, and the authorized operator user of a domain are able to invoke a management function call of registry smart contract 202 to transfer domain ownership, set a new associated resolver smart contract, mint a new subdomain, or destroy the domain. Only the owner account is able to invoke a program function of registry smart contract 202 to add or remove the approved user and the authorized operator.

Each domain of the registry smart contract identifies a corresponding associated resolver smart contract that is used for resolving domains and storing domain records. Using this separate resolver smart contract, domain owners and authorized users can store target records for the name identifier of a domain for resolution (e.g., cryptocurrency addresses, chat IDs, and IPFS hashes for decentralized websites, etc.). For example, the resolver smart contract stores in a blockchain the target records of one or more domains and a program function of the registry smart contract is able to be invoked to update a target record or obtain a target record for a domain. Thus, a user is able to use registry smart contract 202 to look up an address of a resolver smart contract for a name of a domain and request to this resolver smart contract a resolution of the name of the domain. A domain of registry smart contract 202 is able to point to any resolver smart contract whether it be a standard/default resolver smart contract (e.g., smart contract 204) that is available to use as a default or a custom resolver smart contract (e.g., smart contract 206) that a user is able to customize and deploy to perform any custom functionality as desired. For example, a smart contract can be programmed to even invoke another smart contract.

A single resolver smart contract may be able to manage and handle resolution of multiple different domains. Default resolver smart contract 204 includes a different preset for different domains and each preset holds records for the domain. For example, the records inside the resolver smart contract are stored as a nested mapping from Domain Token ID->Preset ID->Key->Value. This nested structure allows users to configure domains on the un-enumerable Ethereum mappings (e.g., it is expensive and unreliable to store an enumerable data structure on Ethereum). This allows an authorized user to change the preset associated with a domain to link an entirely different set of records to the domain.

The same name of a domain is able to be resolved into multiple different target records of different types. For example, a request to resolve a name of a domain identifies a desired target identifier or action type and the resolver smart contract looks up and returns a target identifier/action of a particular type among many different types stored by the resolver smart contract for the same domain. Thus resolver smart contract 204 stores in its records for a particular domain, key-value pairs of target identifier/action type keys and target identifier values, allowing the resolver smart contract to effectively map a domain (e.g., hash of a name of the domain) to key-value dictionaries of records.

An example of a list of record types able to be stored and returned/performed by a resolver smart contract includes: a cryptocurrency account address, a preferred browser protocol, a browser redirect URL (e.g., allowing redirection at the name service level), a distributed web record, an IPFS network content hash, a swarm network content hash, a web Domain Name System (DNS) record, a default DNS time-to-live (TTL) setting, a DNS Canonical Name (CNAME), an IP address, a deprecated record, an account username, a chat user identifier, a social network user identifier, or any communication user identifier.

In some embodiments, the name service does not prohibit an authorized user from assigning any record of a domain to any value. However, a list of known standard records is defined to allow standard interpretation by clients. In some embodiments, standard record types include:

crypto.*—Records related to crypto payments
dns.*—DNS records
dweb.*—Records related to distributed content network protocols
browser.*—Hint records for web browsers The name service allows a human-readable name to be used instead of a destination address for a cryptocurrency payment. Cryptocurrency wallets that use this feature can resolve a domain to an underlying cryptocurrency address in the same way a browser resolves a domain to an IP address. Cryptocurrency addresses are stored in the resolver smart contract within the crypto.* standard namespace of the domain. Each currency address is stored as a "crypto.<TICKER>.address" record. For example, a Bitcoin address is stored in "crypto.BTC.address." Addresses are stored in plain text format according to an address space standard established by each currency. The currency's namespace can contain additional currency-specific attributes to facilitate payment delivery.

Figure 3:
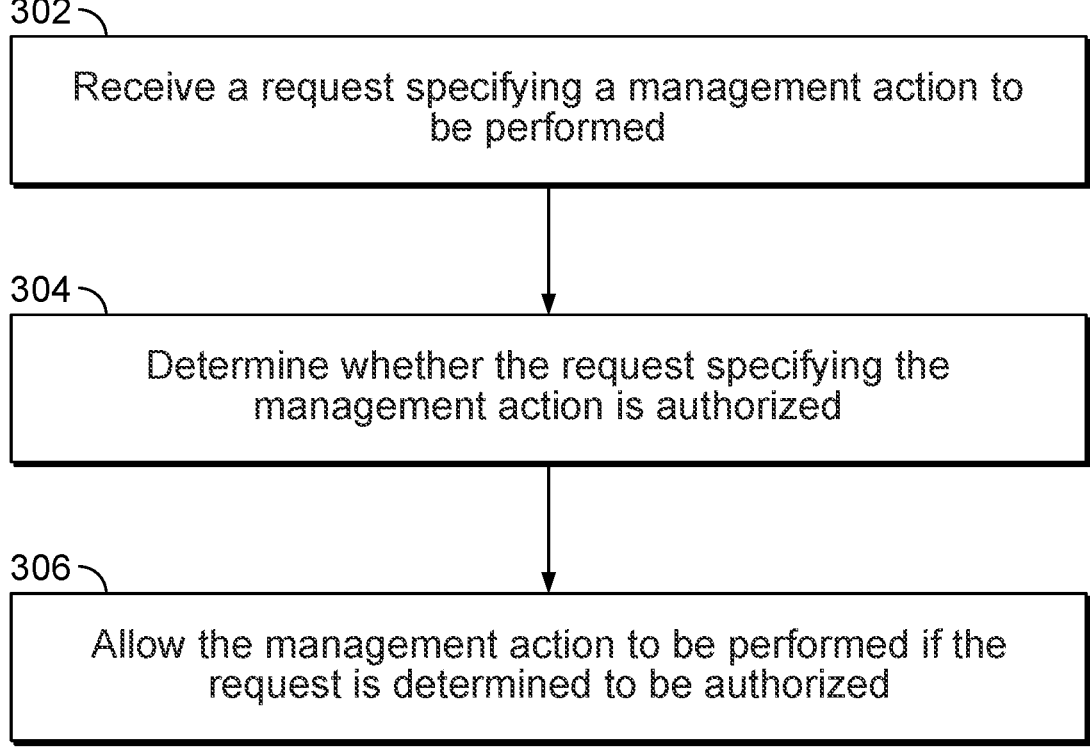
FIG. 3 is a flowchart illustrating an embodiment of a process for managing a domain of a blockchain-based name service.

FIG. 3 is a flowchart illustrating an embodiment of a process for managing a domain of a blockchain-based name service. In some embodiments, at least a portion of the process of FIG. 3 is implemented on management server(s) (e.g., one or more servers of server(s) 904 of FIG. 9) providing a service to manage blockchain-based name service executing on distributed computers of a blockchain. In some embodiments, at least a portion of the process of FIG. 3 is implemented on one or more networked computers implementing a distributed blockchain (e.g., one or more computers of blockchain 908 of FIG. 9). An example of a smart contract that is used to execute the process of FIG. 3 is registry smart contract 102 and/or 202 of FIGS. 1 and 2.

At 302, a request specifying a management action to be performed is received. In some embodiments, the request is made to a registry smart contract by a requestor by performing a program function call to an address of the registry smart contract on a blockchain. The management action may be one or more of the following: transfer a domain to a new owner, set a resolver contract for a domain, create a new subdomain for the domain, remove/burn a domain, add or remove an approved account that can control the domain, or add or remove an operator account for an owner that can control every domain owned by the owner (e.g., the request is for an owner account rather than only for a specific domain). The request identifies the domain via a hash identifier (e.g., serves as the identifier of the non-fungible token representing the domain). The hash identifier is a more storage efficient representation of the name of the domain and the name of the domain can be easily converted to a hash identifier using a hash function.

At 304, it is determined whether the request specifying the management action is authorized. The request is authorized to be provided by an owner of a domain, an approved alternative account specified for the domain (e.g., specified using the registry smart contract), or an operator account specified (e.g., using the registry smart contract) to be allowed to control every domain owned by the owner. In order to prove that the user account that provided the request is authentic, the user account can sign the request using a private cryptographic key of the user account and this signature is verified using a public key of the user account to authenticate the user account. If the authenticated user account is an owner, an approved account, or an operator of the domain according to the blockchain record of the registry smart contract, it is determined that the request is authorized. If the account that provided the request cannot be authenticated or the authenticated user account is not authorized for the domain, the request is not authorized.

In some embodiments, an authorized account is able to provide temporary authorization on a per management action transaction level by signing a request message for another account that can provide the request message for later execution when presented. For example, to grant temporary management authority on a per request level via a meta-transaction, an owner, an approved account, or an operator for a domain is able to sign a request using its private cryptographic key and provide it to another user/account that will issue the request for execution when desired. This allows the authorized management of the meta-transaction to be asynchronously executed when desired by the other user/account. In the event the received request is specified as a meta-transaction, the request includes the signature of the authorized account of the domain of the request (different from the account that provided the request) and this signature is verified to ensure it is authentic. If it is authentic and the account that signed it is an owner, an approved account, or an operator for the domain, it is determined that the request is authorized. Otherwise, the meta-transaction request is not authorized. Additional details on meta-transactions are discussed later in the specification in conjunction with FIG. 5.

At 306, the management action is allowed to be performed if the request is determined to be authorized. For example, the domain of the request is transferred to a new owner, a resolver contract is set for the domain, a subdomain is created for the domain, the domain is deleted/burned, an approved account that can control the domain is added or removed, or an operator account for an owner that can control every domain owned by the owner is added or removed.

FIG. 4 is a flowchart illustrating an embodiment of a process for updating target records of a domain managed using a blockchain-based name service. In some embodiments, at least a portion of the process of FIG. 4 is implemented on one or more networked computers implementing a distributed blockchain (e.g., one or more computers of blockchain 908 of FIG. 9). In some embodiments, at least a portion of the process of FIG. 4 is implemented on management server(s) (e.g., one or more servers of server(s) 904 of FIG. 9) providing a service to manage blockchain-based name service executing on distributed computers of a blockchain. An example of a smart contract that is used to execute the process of FIG. 4 is resolver smart contract 104 and/or 204 of FIGS. 1 and 2.

At 402, a request to update for a domain, a target record of a specified type is received. In some embodiments, the request is made to a resolver smart contract of the domain by a requestor by performing a program function call to an address of the resolver smart contract on a blockchain. In some embodiments, the resolver smart contract for the domain is identified by requesting an address of the resolver smart contract of the domain to a registry smart contract. The request to update a target record identifies the domain via a hash identifier of the name of the domain (e.g., serves as the identifier of the non-fungible token representing the domain).

The same name of a domain is able to be resolved into multiple different target records of different types. For example, a request to resolve a name of a domain identifies a desired target identifier or action type and the resolver smart contract is to look up and return a target identifier/action of a particular type among many different types stored by the resolver smart contract for the same domain. Thus the resolver smart contract is able to store in its records for the particular domain, key-value pairs of target record type keys and target identifier values, allowing the resolver smart contract to effectively map the domain (e.g., hash of a name of the domain) to key-value dictionaries of records. The received request may specify a command to add, modify, or delete the target record of the domain using a target record type (e.g., key) and/or a corresponding data/identifier (e.g., value) specified in the request.

In response to the request, it is determined whether the request is authorized. The request is authorized to be provided by an owner of a domain, an approved alternative account specified for the domain (e.g., specified using the registry smart contract), or an operator account specified (e.g., using the registry smart contract) to be allowed to control every domain owned by the owner. In order to prove that the user account that provided the request is authentic, the user account can authenticate the request using a private cryptographic key of the user account and this signature is verified using a public key of the user account to authenticate the user account. In some embodiments, because the authorized account information is stored in the separate registry smart contract, the registry smart contract is consulted to determine if the authenticated user account is an owner, an approved account, or an operator of the domain according to the blockchain record of the registry smart contract. If the authenticated user account is an authorized user account, it is determined that the request is authorized. If the account that provided the request cannot be authenticated or the authenticated user account is not authorized for the domain, the request is not authorized and the request is rejected.

In some embodiments, the received request is specified as a meta-transaction and the request includes the signature of the authorized account of the domain of the request (different from the account that provided the request) and this signature is verified to ensure it is authentic. If it is authentic and the account that signed it is an owner, an approved account, or an operator for the domain, it is determined that the request is authorized. Otherwise, the meta-transaction request is not authorized. Additional details on meta-transactions are discussed later in the specification in conjunction with FIG. 5.

At 404, a blockchain of a resolver smart contract is updated to associate the target record of the specified type to the domain. A single resolver smart contract may be able to manage and handle resolution of multiple different domains and the resolver smart contract includes a different preset for different domains and each preset holds records for the domain. For example, the records inside the resolver smart contract are stored as a nested mapping from Domain Token ID->Preset ID->Key->Value. This nested structure allows users to configure domains on the un-enumerable Ethereum mappings (e.g., it is expensive and unreliable to store an enumerable data structure on Ethereum), allowing an authorized user to change the preset associated with a domain to link an entirely different set of records to the domain. Using the token identifier of the domain included in a request, the resolver smart contract identifies the corresponding preset and the type and value of the target record (e.g., key/value pair) are updated (e.g., added, removed, or modified) under the identified preset.

An example of a list of record types able to be updated by the resolver smart contract is as follows: a cryptocurrency account address, a preferred browser protocol, a browser redirect URL (e.g., allowing redirection at the name service level), a distributed web record, an IPFS network content hash, a swarm network content hash, a web DNS record, a default TTL setting, a DNS CNAME, an IP address, a deprecated record, an account username, a chat user identifier, a social network user identifier, or any communication user identifier.

Figure 5:
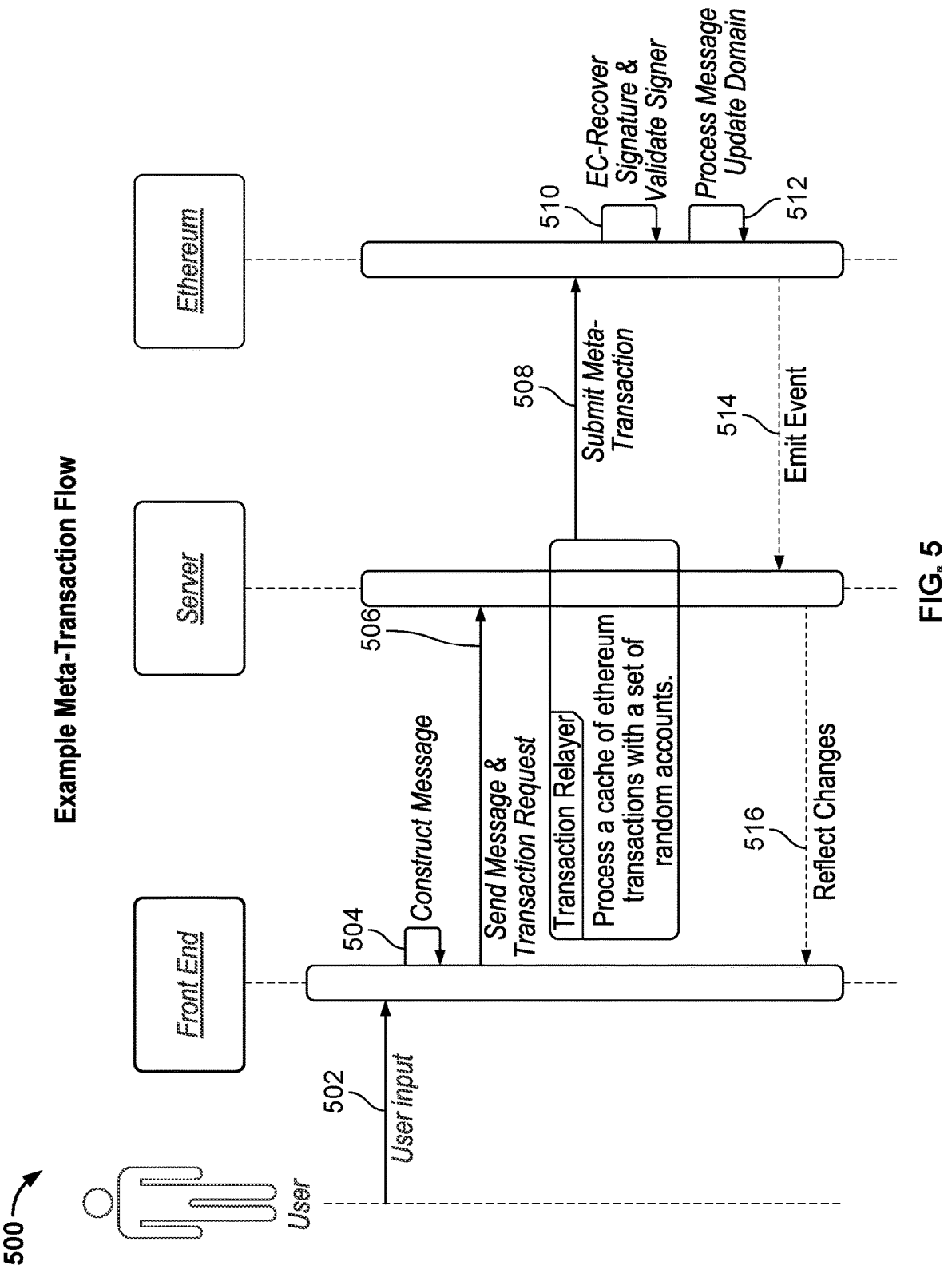
FIG. 5 is a flow diagram illustrating an embodiment of performing a meta-transaction for a domain managed using a blockchain-based name service.

FIG. 5 is a flow diagram illustrating an embodiment of performing a meta-transaction for a domain managed using a blockchain-based name service. Examples of the meta-transaction include the request to the registry smart contract in 302 specifying a management action to be performed and the request to the resolver smart contract in 402 to update for the domain, a target record of a specified type.

In some embodiments, an authorized account for a domain is able to provide authorization on a per management transaction level by signing the request that can be invoked by another account when desired. For example, to grant temporary management authority on a per request level via a meta-transaction, an owner, an approved account, or an operator for a domain is able to sign a request using its private cryptographic key and provide to another user/account that will provide the request for execution when desired. This allows the authorized management of the meta-transaction to be asynchronously executed when desired by the other user/account. In the event the received request is specified as a meta-transaction, the request includes the signature of the authorized account of the domain of the request (different from the account that provided the request) and this signature can be verified to ensure it is authentic. If it is authentic and the account that signed it is an owner, an approved account, or an operator for the domain, it is determined that the request is authorized. Otherwise, the meta-transaction request is not authorized.

In some embodiments, the registry smart contract and/or the resolver smart contract includes special program functions that can be called to indicate that the requested transaction is a meta-transaction. For example, each management function of the smart contracts has a corresponding meta-transaction version that allows as an argument/input to provide a message signed by an authorized account of the domain. This allows a third party to submit transactions on behalf of an authorized account while still allowing the authorized account to still manage its domain in a self-custodial capacity In transaction flow diagram 500 shown in FIG. 5, an authorized account uses the front end (e.g., client 902 of FIG. 9) to indicate, via user input 502 for a domain, a transaction desired to be executed on behalf of the user. In step 504, the front end generates the message specifying and authorizing the meta-transaction. The message identifies the desired action/function desired to be executed by the meta-transaction as well as its parameters. The message is signed using the cryptographic key (e.g., private key) of the authorized account to prove its authenticity.

The message may include a domain based meta-transaction nonce to prevent the message from being replayed (e.g., prevent it from being used more than once). The nonce includes a transaction counter specifically tracked for each domain/token. This prevents replay attacks where a transfer of a token can be replayed over and over to continually revert the state of the name back to a previous state. The nonce counter is incremented by one each time a state transition happens to a token. Domain token-based nonces can be also used to prevent mis-ordering of transactions. For example, this prevents front running non-fungible assets and enables secure transaction batching.

Figure 9:
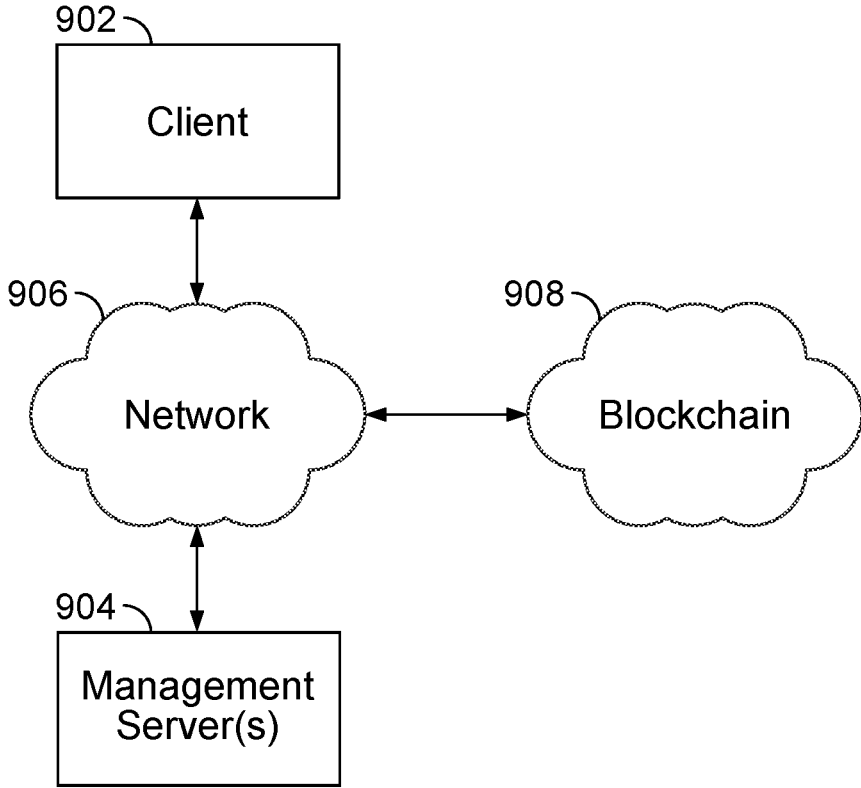
FIG. 9 is a block diagram illustrating an embodiment of a blockchain-based name service environment.

The generated message is included in a transaction request and sent in 506 to the server (e.g., management server(s) 904 of FIG. 9) of the third-party that will be submitting the meta-transaction on behalf of the authorized account of the domain. The server can hold this meta-transaction until later when it desires to execute the transaction by submitting to the appropriate blockchain (e.g., blockchain 908 of FIG. 9) smart contract in 508. This request by the server includes the message signed by the authorized account of the domain and is also signed by the third-party requestor submitting the meta-transaction using its cryptographic key to generate its classical signature typically submitted to the blockchain to prove its authenticity.

The blockchain smart contract then checks the authorization to execute the meta-transaction in 510 by verifying that the included message signature purported to be signed by the authorized account (e.g., not the signature of the submitter of the request in 508) was actually signed by an authorized account identified in the record of the registry smart contract for the domain of the request. Once the message signature is verified, the requested transaction is executed in 512 and a confirmation of the execution is passed back in 514 and 516.

FIG. 6 is a flowchart illustrating an embodiment of a process for resolving a domain managed using a blockchain-based name service. In some embodiments, at least a portion of the process of FIG. 6 is implemented on one or more networked computers implementing a distributed blockchain (e.g., one or more computers of blockchain 908 of FIG. 9). In some embodiments, at least a portion of the process of FIG. 6 is implemented on management server(s) (e.g., one or more servers of server(s) 904 of FIG. 9) providing a service to manage blockchain-based name service executing on distributed computers of a blockchain. An example of a smart contract that is used to execute the process of FIG. 6 is resolver smart contract 104 and/or 204 of FIGS. 1 and 2.

At 602, a request to resolve a name of a domain into a target record is received. In some embodiments, the request is made to a resolver smart contract of the domain by a requestor by performing a program function call to an address of the resolver smart contract on a blockchain. In some embodiments, the resolver smart contract for the domain is identified by requesting an address of the resolver smart contract of the domain to a registry smart contract. The request may identify the name of the domain via a hash identifier determined by hashing the name using a hash function. The request may also identify the type of target record desired to be obtained. For example, the same name of a domain is able to be resolved into multiple different target records of different types, and the request identifies one of these types desired to be obtained.

At 604, the requested target record is obtained and returned in response to the request. For example, the resolver smart contract obtains the target record of a specified type for the domain from its blockchain storage and returns the target record.

In some embodiments, because a single resolver smart contract may be able to manage and handle resolution of multiple different domains, the resolver smart contract includes a different preset for different domains and each preset holds records for the domain. For example, the records inside the resolver smart contract are stored as a nested mapping from Domain Token ID->Preset ID->Key->Value. This nested structure allows users to configure domains on the un-enumerable Ethereum mappings (e.g., it is expensive and unreliable to store an enumerable data structure on Ethereum), allowing an authorized user to change the preset associated with a domain to link an entirely different set of records to the domain. Using the token identifier of the domain included in a request, the resolver smart contract identifies the corresponding preset of the domain, obtains the target record of the type (e.g., key of the record) specified by the request, and returns the value of the record. Examples of the return target record returned include: a cryptocurrency account address, a preferred browser protocol, a browser redirect URL (e.g., allowing redirection at the name service level), a distributed web record, an IPFS network content hash, a swarm network content hash, a web DNS record, a default TTL setting, a DNS CNAME, an IP address, a deprecated record, an account username, a chat user identifier, a social network user identifier, or any communication user identifier.

FIG. 7 is a flow diagram illustrating an embodiment of resolving a name identifier using a blockchain-based name service for a cryptocurrency transaction. An example of a smart contract that is used to execute the flow of FIG. 7 is resolver smart contract 104 and/or 204 of FIGS. 1 and 2.

One way to integrate with the name service is through resolution of the name of the domain into a cryptocurrency address. This process converts a human-readable name like "brad.crypto" to the cryptocurrency addresses that the name service stores in its blockchain. For example, a user can send a bitcoin to "brad.crypto" and it will go to Brad's bitcoin address. A user can also send an Ethereum coin to "brad.crypto" and it will go to Brad's Ethereum address.

In the example shown in diagram 700, the application retrieves a domain's records through a resolver smart contract deployed on the blockchain (e.g., via the Ethereum or Zilliqa blockchains). In the shown diagram, an ETH cryptocurrency token is being sent to "example.crypto." The application sends those two parameters to the resolver smart contract on the Ethereum blockchain and it returns the record stored under "crypto.ETH.address" for that domain. This address can be used to complete the ETH cryptocurrency token transfer.

Figure 8:
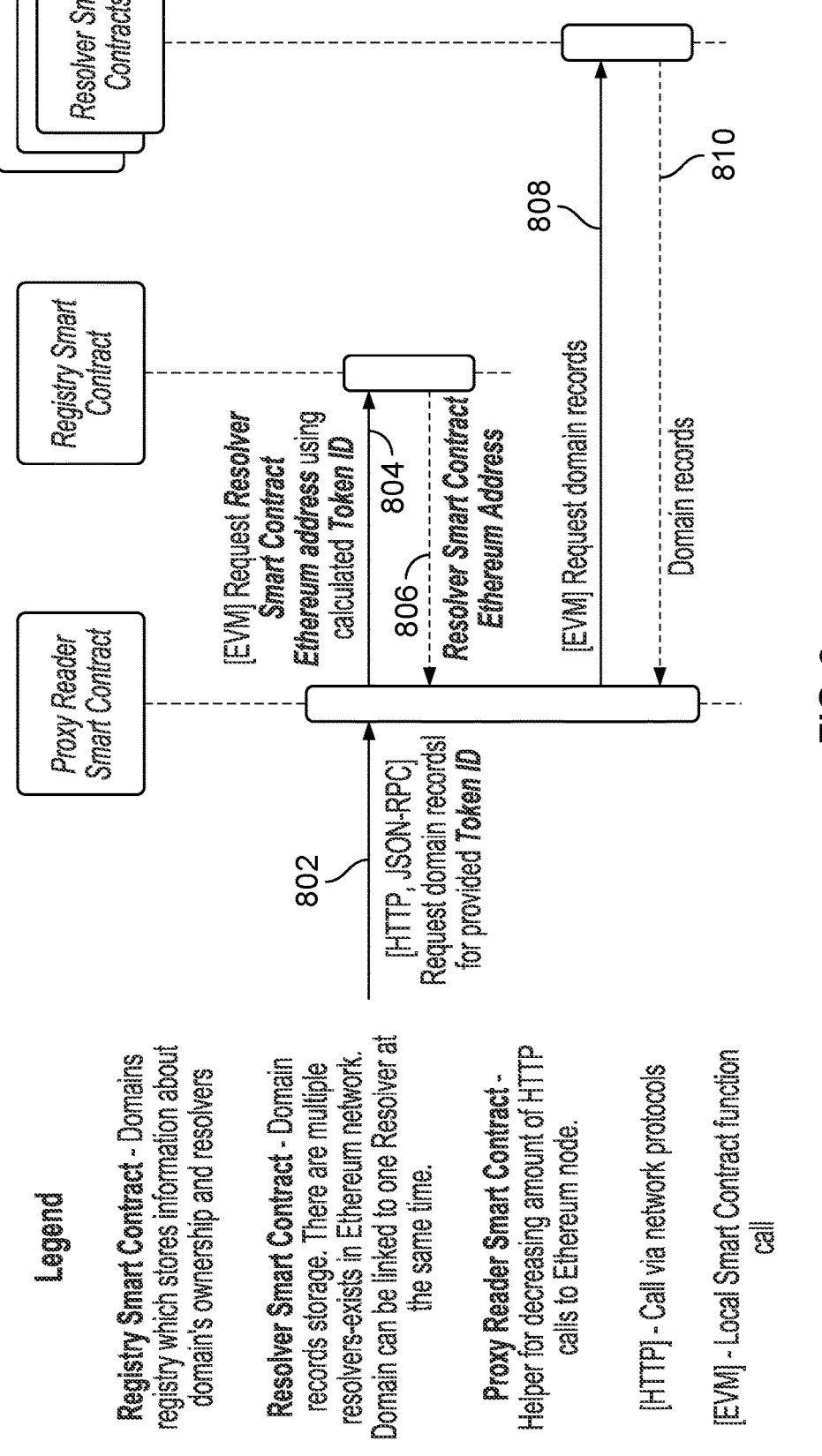
FIG. 8 is a flow diagram illustrating an embodiment of using a proxy reader smart contract to resolve a target record of a domain managed using a blockchain-based name service.

FIG. 8 is a flow diagram illustrating an embodiment of using a proxy reader smart contract to resolve a target record of a domain managed using a blockchain-based name service. In some embodiments, at least a portion of the process of FIG. 8 is implemented on one or more networked computers implementing a distributed blockchain (e.g., one or more computers of blockchain 908 of FIG. 9). In the previously described examples of the registry smart contract (e.g., registry smart contract 102 and/or 202 of FIGS. 1 and 2) and the resolver smart contract (e.g., resolver smart contract 104 and/or 204 of FIGS. 1 and 2), an application/user desiring to resolve a name of the domain made a first program function call to the registry smart contract to obtain the address of the resolver smart contract for the domain and then made a second function call to the resolver smart contract to obtain the target domain record. However, making two different function calls to two different smart contracts adds complexity to the name service that is undesirable for many users. In order to simplify the resolution of the domain, a proxy reader smart contract that enables a single function call to handle this complexity for the user is shown in diagram 800.

The proxy reader smart contract receives request 802 to resolve a name of a domain into a target record (e.g., the request received in 502 of FIG. 5). Request 802 may include a hash of the name of the domain (e.g., Token ID) and an identifier of a type of target record desired to be obtained. The proxy reader smart contract acts as a proxy to make the appropriate calls to both the registry smart contract and the corresponding resolver smart contract, allowing the requestor to make a single call that returns the desired domain record. The proxy reader smart contract makes call 804 to the registry smart contract to request the address of the resolver smart contract corresponding to the domain (e.g., corresponding to the Token ID of the domain). The registry smart contract returns response 806 providing the corresponding resolver smart contract address. The proxy reader smart contract makes call 808 to the obtained resolver smart contract address to request the desired record of the domain. The resolver smart contract returns response 810 that provides the desired record. This obtained record is then able to be provided by the proxy reader smart contract to the requestor in response to request 802.

FIG. 9 is a block diagram illustrating an embodiment of a blockchain-based name service environment. Client 902 includes any computer using the blockchain-based name service. For example, client 902 requests resolution of a name of a domain of the blockchain-based name service to a target record, updates a target record for a name of a domain of the blockchain-based name service, and/or performs any management action associated with a domain of the blockchain-based name service. Any number of client 902 may exist. A request sent by client 902 is provided to management server(s) 904 and/or blockchain 908 via computer network 906. Management server(s) 904 includes one or more servers providing a service to manage the blockchain-based name service executing on blockchain 908. For example, rather than directly managing the blockchain-based name service on blockchain 908, an owner of a domain uses a service provided by management server(s) 904 to assist the owner by performing management actions on blockchain 908 for the owner. The owner may grant management server(s) 904 authorization to manage its domain(s) (e.g., via as an approved user, as an operator, or per management action meta-transaction). This allows a management action request received at management server (s) 904 from client 904 to be initiated by management server(s) 904 on blockchain 908. Blockchain 908 includes one or more distributed network(s) of servers and computers implementing a crypto blockchain (e.g., Ethereum blockchain) that enable smart contracts of the blockchain-based name service to be executed.

Figure 10:
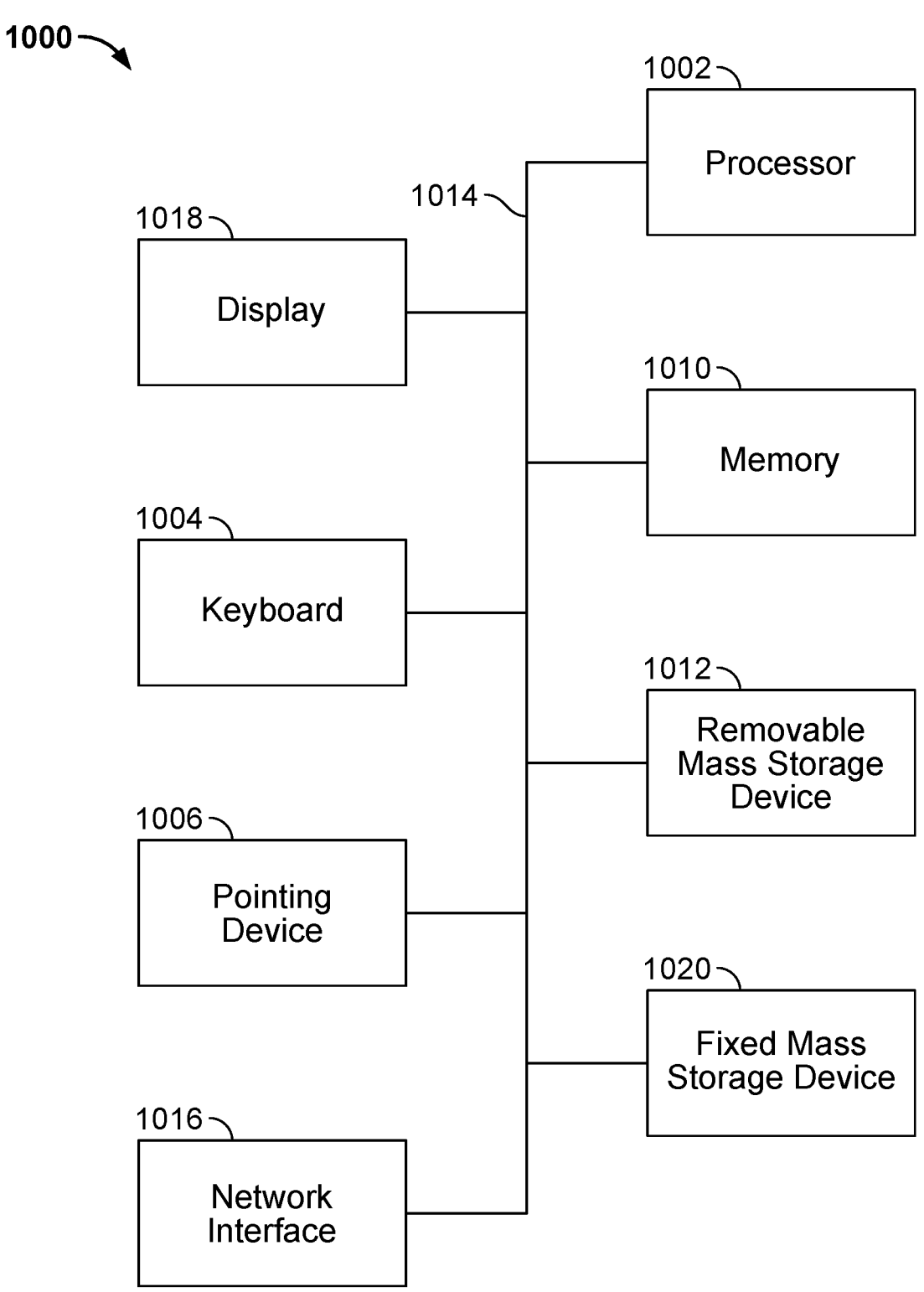
FIG. 10 is a functional diagram illustrating a programmed computer system for using, managing, or executing a blockchain-based name service in accordance with some embodiments.

FIG. 10 is a functional diagram illustrating a programmed computer system for using, managing, or executing a blockchain-based name service in accordance with some embodiments. As will be apparent, other computer system architectures and configurations can be used to use, manage, or execute the blockchain-based name service. Examples of computer system 1000 includes client 902, one or more computers included in management server(s) 904, or one or more computers included in blockchain 908 of FIG. 9. Computer system 1000, which includes various subsystems as described below, includes at least one microprocessor subsystem (also referred to as a processor or a central processing unit (CPU)) 1002. For example, processor 1002 can be implemented by a single-chip processor or by multiple processors. In some embodiments, processor 1002 is a general purpose digital processor that controls the operation of the computer system 1000. Using instructions retrieved from memory 1010, the processor 1002 controls the reception and manipulation of input data, and the output and display of data on output devices (e.g., display 1018).

Processor 1002 is coupled bi-directionally with memory 1010, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1002. Also as is well known in the art, primary storage typically includes basic operating instructions, program code, data and objects used by the processor 1002 to perform its functions (e.g., programmed instructions). For example, memory 1010 can include any suitable computer-readable storage media, described below, depending on whether, for example, data access needs to be bi-directional or unidirectional. For example, processor 1002 can also directly and very rapidly retrieve and store frequently needed data in a cache memory (not shown).

A removable mass storage device 1012 provides additional data storage capacity for the computer system 1000, and is coupled either bi-directionally (read/write) or unidirectionally (read only) to processor 1002. For example, storage 1012 can also include computer-readable media such as magnetic tape, flash memory, PC-CARDS, portable mass storage devices, holographic storage devices, and other storage devices. A fixed mass storage 1020 can also, for example, provide additional data storage capacity. The most common example of mass storage 1020 is a hard disk drive. Mass storage 1012, 1020 generally store additional programming instructions, data, and the like that typically are not in active use by the processor 1002. It will be appreciated that the information retained within mass storage 1012 and 1020 can be incorporated, if needed, in standard fashion as part of memory 1010 (e.g., RAM) as virtual memory.

In addition to providing processor 1002 access to storage subsystems, bus 1014 can also be used to provide access to other subsystems and devices. As shown, these can include a display monitor 1018, a network interface 1016, a keyboard 1004, and a pointing device 1006, as well as an auxiliary input/output device interface, a sound card, speakers, and other subsystems as needed. For example, the pointing device 1006 can be a mouse, stylus, track ball, or tablet, and is useful for interacting with a graphical user interface.

The network interface 1016 allows processor 1002 to be coupled to another computer, computer network, or telecommunications network using a network connection as shown. For example, through the network interface 1016, the processor 1002 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1002 can be used to connect the computer system 1000 to an external network and transfer data according to standard protocols. For example, various process embodiments disclosed herein can be executed on processor 1002, or can be performed across a network such as the Internet, intranet networks, or local area networks, in conjunction with a remote processor that shares a portion of the processing. Additional mass storage devices (not shown) can also be connected to processor 1002 through network interface 1016.

An auxiliary I/O device interface (not shown) can be used in conjunction with computer system 1000. The auxiliary I/O device interface can include general and customized interfaces that allow the processor 1002 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system.

Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 10 is but an example of a computer system suitable for use with the various embodiments disclosed herein. Other computer systems suitable for such use can include additional or fewer subsystems. In addition, bus 1014 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving a request to resolve a name identifier into a target record of a specified record type requested in the request, wherein the target record is included a plurality of different target records of different record types for the same the name identifier and the name identifier serves as an alternative identifier that is different from and used in place of a target identifier in the target record;

using a computer hardware processor to obtain using a blockchain the target record of the specified record type that resolves from the name identifier, including by selecting the specified record type among a plurality of different record types available to be resolved from the same name identifier, wherein the plurality of different target records of the different record types includes a plurality of different target identifiers of the plurality of different record types and wherein the same name identifier is able to be used as the alternative identifier in place of each of the different target identifiers of the plurality of different record types; and in response to the request, providing the target identifier in the target record of the specified record type that corresponds to the name identifier, wherein an association between the name identifier and a corresponding owner account is stored in the blockchain, and an association between the name identifier and at least one of the plurality of different target records of the specified record type is stored in the blockchain using a smart contract, and the blockchain is used to store the plurality of different target records of the different record types that are alternative identifiers for the same name identifier.

2. The method of claim 1, wherein the target record is a cryptocurrency address.

3. The method of claim 1, wherein the plurality of different target records of different types for the same name identifier includes a plurality of different cryptocurrency addresses for different cryptocurrencies.

4. The method of claim 1, wherein the target record is one of the following: a preferred browser protocol, a browser redirect URL, a distributed web record, an IPFS network content hash, a swarm network content hash, a web DNS record, a default DNS TTL setting, a DNS CNAME, an IP address, a deprecated record, an account username, a chat user identifier, a social network user identifier, or a communication user identifier.

5. The method of claim 1, wherein the name identifier is included in the request as a hash value.

6. The method of claim 1, wherein the name identifier is of a domain managed by a blockchain smart contract as a non-fungible token.

7. A system, comprising:

one or more processors configured to:

receive a request to resolve a name identifier into a target record of a specified record type requested in the request, wherein the target record is included a plurality of different target records of different record types for the same the name identifier and the name identifier serves as an alternative identifier that is different from and used in place of a target identifier in the target record;

obtain using a blockchain the target record of the specified record type that resolves from the name identifier, including by selecting the specified record type among a plurality of different record types available to be resolved from the same name identifier, wherein the plurality of different target records of the different record types includes a plurality of different target identifiers of the plurality of different record types and wherein the same name identifier is able to be used as the alternative identifier in place of each of the different target identifiers of the plurality of different record types; and in response to the request, provide the target identifier in the target record of the specified record type that corresponds to the name identifier, wherein an association between the name identifier and a corresponding owner account is stored in the blockchain, and an association between the name identifier and at least one of the plurality of different target records of the specified record type is stored in the blockchain using a smart contract, and the blockchain is used to store the plurality of different target records of the different record types that are alternative identifiers for the same name identifier; and a memory coupled with at least one of the one or more processors and configured to provide instructions.

8. The system of claim 7, wherein the target record is a cryptocurrency address.

9. The system of claim 7, wherein the plurality of different target records of different types for the same name identifier includes a plurality of different cryptocurrency addresses for different cryptocurrencies.

10. The system of claim 7, wherein the target record is one of the following: a preferred browser protocol, a browser redirect URL, a distributed web record, an IPFS network content hash, a swarm network content hash, a web DNS record, a default DNS TTL setting, a DNS CNAME, an IP address, a deprecated record, an account username, a chat user identifier, a social network user identifier, or a communication user identifier.

11. The system of claim 7, wherein the name identifier is included in the request as a hash value.

12. The system of claim 7, wherein the name identifier is of a domain managed by a blockchain smart contract as a non-fungible token.

13. A computer program product, the computer program product being embodied in a non-transitory computer readable storage medium and comprising computer instructions for:

receiving a request to resolve a name identifier into a target record of a specified record type requested in the request, wherein the target record is included a plurality of different target records of different record types for the same the name identifier and the name identifier serves as an alternative identifier that is different from and used in place of a target identifier in the target record;

obtaining using a blockchain the target record of the specified record type that resolves from the name identifier, including by selecting the specified record type among a plurality of different record types available to be resolved from the same name identifier, wherein the plurality of different target records of the different record types includes a plurality of different target identifiers of the plurality of different record types and wherein the same name identifier is able to be used as the alternative identifier in place of each of the different target identifiers of the plurality of different record types; and in response to the request, providing the target identifier in the target record of the specified record type that corresponds to the name identifier, wherein an association between the name identifier and a corresponding owner account is stored in the blockchain, and an association between the name identifier and at least one of the plurality of different target records of the specified record type is stored in the blockchain using a smart contract, and the blockchain is used to store the plurality of different target records of the different record types that are alternative identifiers for the same name identifier.

14. The computer program product of claim 13, wherein the target record is a cryptocurrency address.

15. The computer program product of claim 13, wherein the plurality of different target records of different types for the same name identifier includes a plurality of different cryptocurrency addresses for different cryptocurrencies.

16. The computer program product of claim 13, wherein the target record is one of the following: a preferred browser protocol, a browser redirect URL, a distributed web record, an IPFS network content hash, a swarm network content hash, a web DNS record, a default DNS TTL setting, a DNS CNAME, an IP address, a deprecated record, an account username, a chat user identifier, a social network user identifier, or a communication user identifier.

17. The computer program product of claim 13, wherein the name identifier is included in the request as a hash value.

18. The computer program product of claim 13, wherein the name identifier is of a domain managed by a blockchain smart contract as a non-fungible token.

* * * * *